Dec. 5, 1967  F. J. ACCORSI  3,356,152
AIRCRAFT PROPULSION SYSTEM
Filed June 14, 1966  3 Sheets-Sheet 1

Dec. 5, 1967  F. J. ACCORSI  3,356,152
AIRCRAFT PROPULSION SYSTEM
Filed June 14, 1966  3 Sheets-Sheet 2

INVENTOR.
FRANK J. ACCORSI
BY
ATTORNEY

Dec. 5, 1967

F. J. ACCORSI 3,356,152

AIRCRAFT PROPULSION SYSTEM

Filed June 14, 1966

INVENTOR.
FRANK J. ACCORSI
BY
ATTORNEY

United States Patent Office 3,356,152
Patented Dec. 5, 1967

3,356,152
AIRCRAFT PROPULSION SYSTEM
Frank J. Accorsi, Columbus, Ohio, assignor to
North American Aviation, Inc.
Filed June 14, 1966, Ser. No. 557,396
2 Claims. (Cl. 170—135.74)

ABSTRACT OF THE DISCLOSURE

An aircraft propulsion system having a turbine engine and connected variable pitch propeller and having a power management control responsive to manual inputs to provide optimum fuel economy as a function of coordinated variable engine fuel flow and variable system rotational speed scheduling during normal flight and to provide minimum thrustpower response delay as a function of coordinated variable engine fuel flow and fixed minimum system rotational speed scheduling during critical maneuvering flight, each with power stabilization involving an engine power governing mode.

---

The propulsion system invention of this application relates generally to aircraft, and specifically concerns a novel manner of coordinating particular controls in a turbine engine and variable-pitch propeller type of aircraft propulsion system to obtain optimum system fuel economy during flight.

It has heretofore been common to provide aircraft propulsion system installations comprised of a governor-regulated variable-pitch propeller and turbine engine combination with a conventional form of control means utilizing separate variable propeller speed and thrustpower level manual control settings to obtain optimum fuel economy during flight. To properly manipulate such control means, aircraft operating personnel have been required to both make use of extensive reference data pertaining to aircraft propulsion system performance characteristics and make control setting determinations in flight from such data using comparatively complex analytical and computational procedures. Through the practice of this invention the extent of such required reference data may be minimized and the determination procedures greatly simplified. The aircraft system pilot is basically required during flight to only compare actual aircraft airspeed, normally indicated by conventional on-board instrumentation, with a known objective airspeed associated with the given aircraft system configuration and operational environment and make a correlated adjustment to a thrustpower level selection lever setting; optimum fuel economy is provided by the system as a function of the single lever setting.

Figure 1:
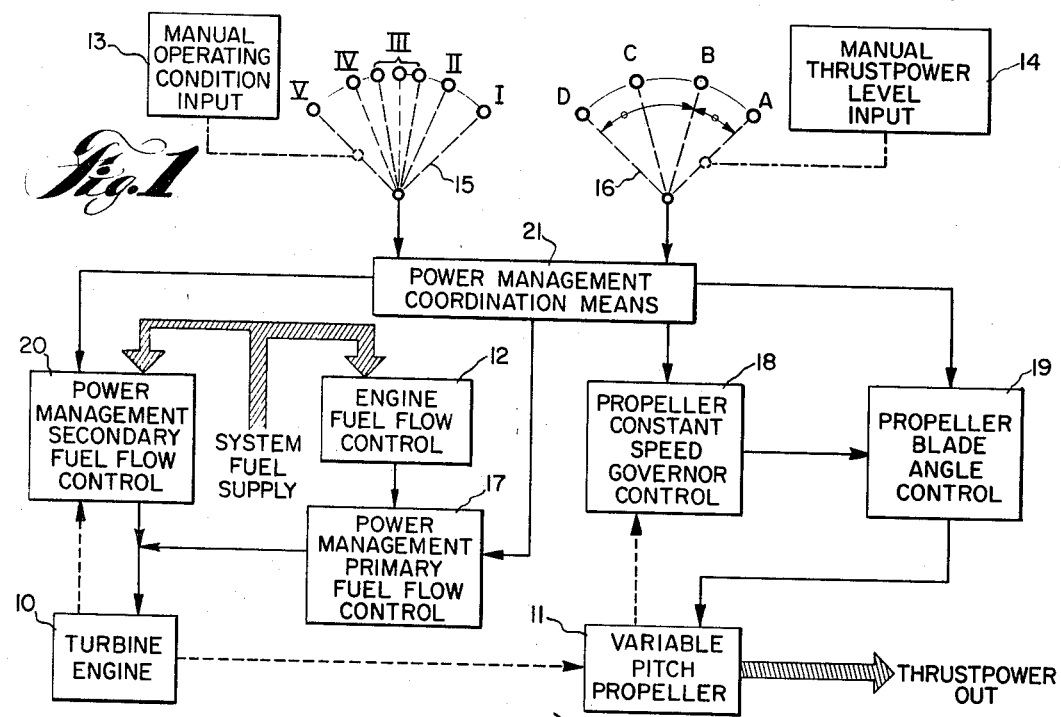
Figure 2:
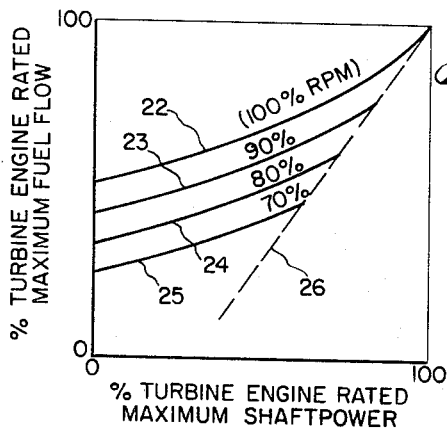
Figure 3:
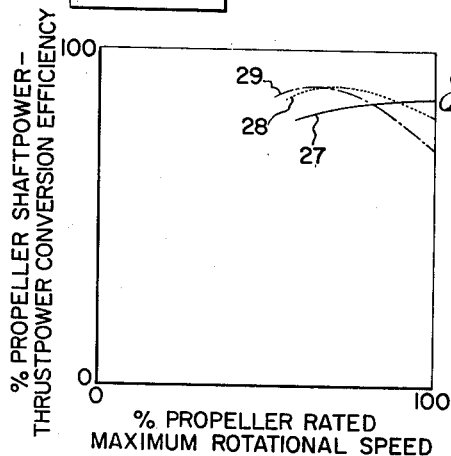
Figure 4:
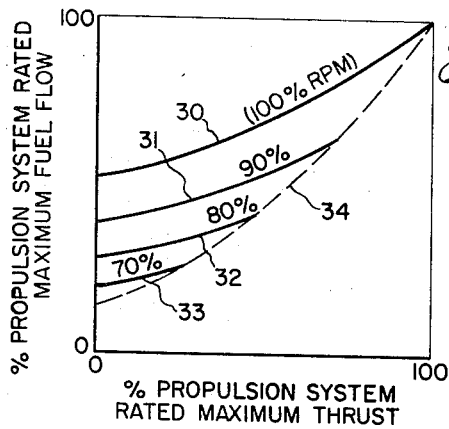
Figure 5:
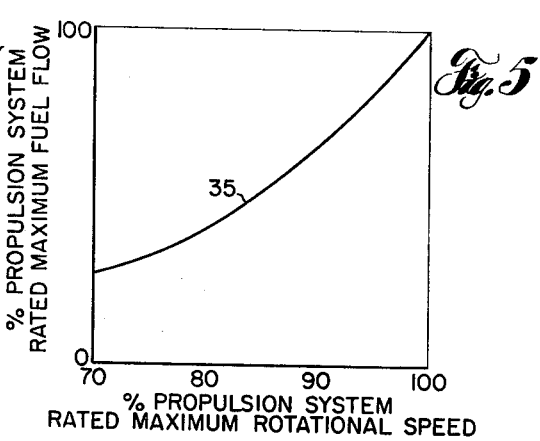
Figure 6:
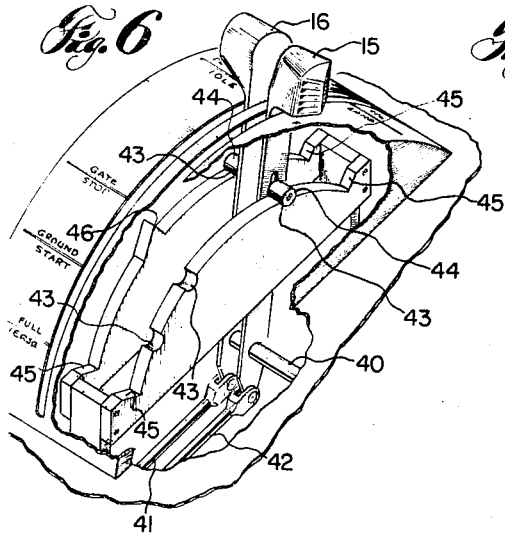
Figure 7:
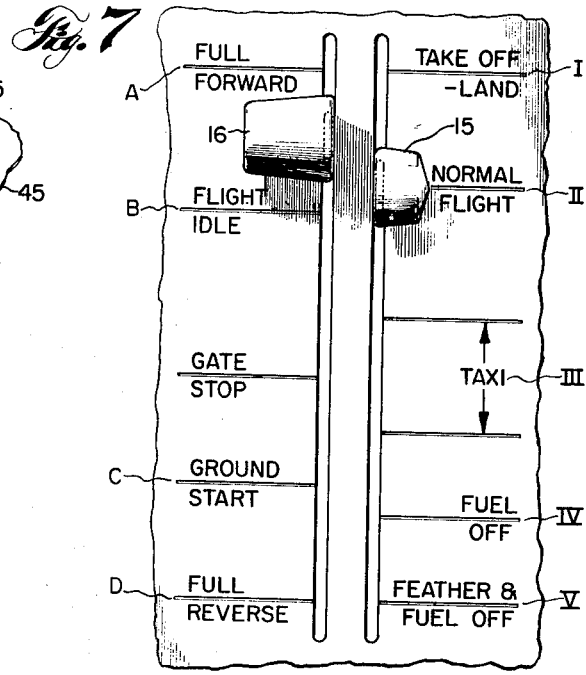
Figure 8:
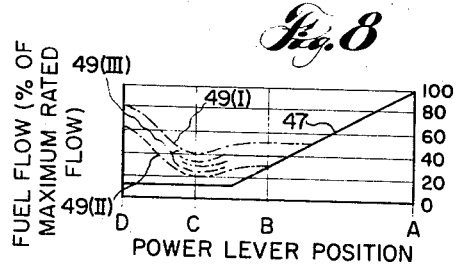
Figure 9:
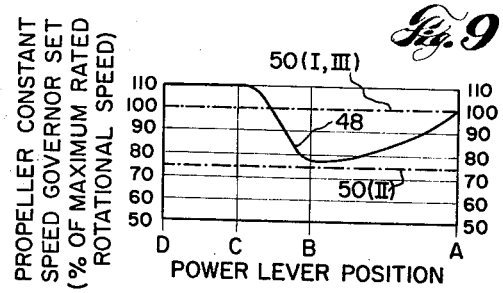
Figure 11:
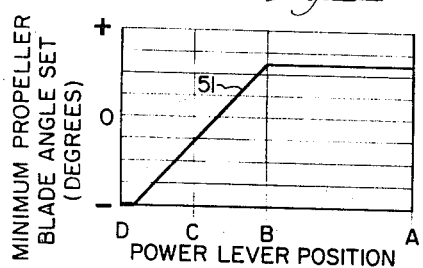
Figure 12:
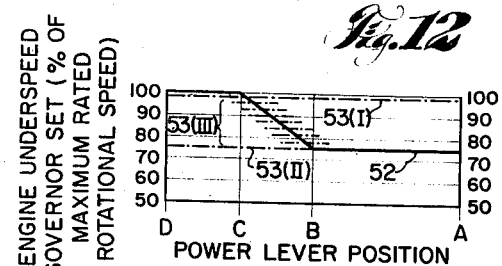
Figure 10:
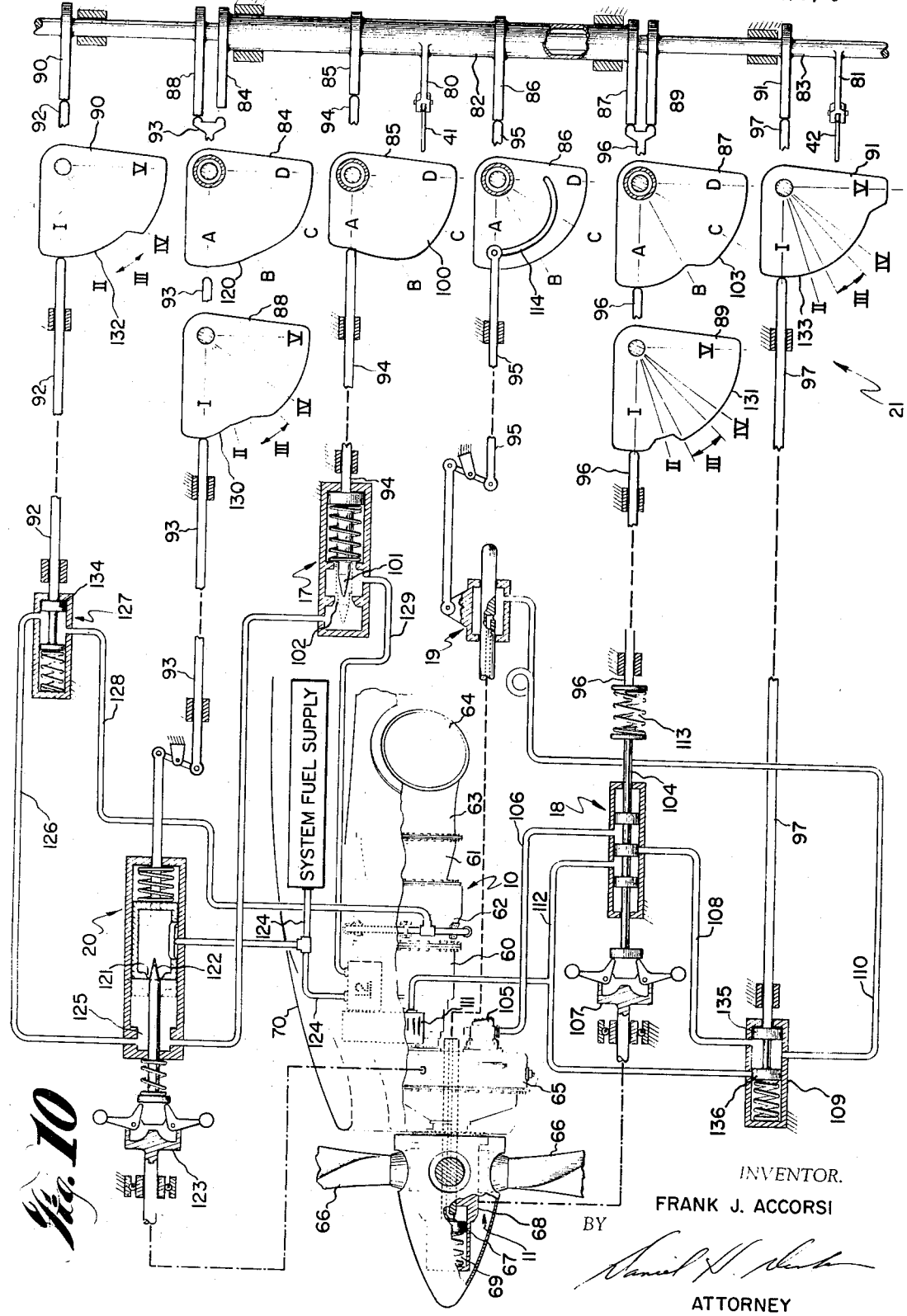

A functional block diagram of a preferred embodiment of an aircraft propulsion system having the invention features described and claimed in this application is illustrated in FIG. 1 of the drawings. FIGS. 2 and 3 provide representative performance data for typical turbine engine and propeller sub-systems utilized in connection with the practice of this invention. FIG. 4 is similar to FIG. 2 but specifically graphically illustrates the relation of propulsion system fuel consumption as a function of propulsion thrust output for various propulsion system rotational speeds. FIG. 5 is a graphical illustration of a fuel flow and rotational speed coordination schedule developed from the relationships shown in FIGS. 2 through 4 and embodied in the power management coordination means of the FIG. 1 propulsion system arrangement. FIGS. 6 and 7 are perspective and plan views, respectively, of portions of a power quadrant that may be incorporated in the FIG. 1 propulsion system arrangement for receiving selected manual control inputs. FIG. 8 illustrates a propulsion system fuel flow schedule as a function of a manual control input applied to position a power quadrant thrustpower lever to practice one portion of the coordinated schedule shown in FIG. 5. FIG. 9 illustrates a propulsion system rotational speed schedule as a function of a manual control input applied to position a power quadrant thrustpower lever to practice another portion of the coordinated schedule shown in FIG. 5. FIG. 10 is a schematic illustration of an aircraft propulsion system having one embodiment of the power management coordination means illustrated as a block function in FIG. 1 and provided with the fuel flow and rotational speed schedules of FIGS. 8 and 9 therein. FIG. 11 illustrates a propeller minimum blade angle schedule as a function of a manual control input applied to position a power quadrant thrustpower lever for additionally obtaining a propeller power governing (beta mode) control of propulsion system power stabilization in the FIG. 1 propulsion system arrangement. FIG. 12 illustrates an engine under-speed governor-setting schedule as a function of a manual control input to position a power quadrant thrustpower lever also for use in obtaining propeller power governing (beta mode) control of propulsion system power stabilization in the FIG. 1 propulsion system arrangement.

As shown by the functional block diagram of FIG. 1, the aircraft propulsion system of this invention includes a turbine engine 10 and variable-pitch propeller 11, such sub-systems being mechanically coupled in driving-driven relation and controlled as to their respective and combined performancce characteristics by manual inputs 13 and 14. Engine 10 is provided with an accessory fuel flow control unit 12 that functions to establish or regulate the maximum allowed fuel flow to the engine for those operating environment conditions sensed by the engine; suitable sensors and fuel flow control unit 12 are normally furnished as a part of the engine sub-system. Although, control input movements are applied to both flight condition lever 15 and a thrustpower level lever 16 comprising the aircraft system control console power quadrant, the advantages of the instant invention, are obtained primarily by the manual manipulation of thrustpower level lever 16 in the manner described herein during normal flight. The power-producing sub-systems 10 and 11 are actually controlled during flight by a power management means primary fuel flow control 17 and by a propeller constant-speed governor control 18 that functions in series with propeller minimum blade angle (pitch) control 19. A power management means secondary fuel flow control 20 in the form of an engine under-speed governor fuel flow control may be included in those embodiments of the invention that require propeller power governing (beta mode) control for power stabilization purposes or that require a modulated reverse-thrust capability. Power management coordination means 21 is provided for properly coordinating controls 17 through 20 in response to different combinations of manual control inputs applied to levers 15 and 16 of the power quadrant.

Flight condition lever 15 is placed in any of several different positions on the basis of pre-selection to obtain particular aircraft system performance characteristics in connection with specific flight or ground operations. In one actual embodiment of the invention, flight condition lever 15 is provided with five different specific positions designated I through V as shown by FIG. 1 (and also by FIGS. 6 and 7). Position I is an override condition utilized in connection with critical aircraft maneuvering such as take-off or landing operations when it is desired to operate the propulsion system continuously at its maximum rated rotational speed to minimize those delays in thrust response associated with system mass acceleration requirements. Position II is utilized for normal flight operations wherein optimum system fuel economy is sought. Although not a critical part of this invention, the range of positions designated as III may be optionally provided for ground operations such as taxiing; positions IV and V may be provided for propulsion system shutdown and emergency condition operations. Normally, the pilot of the aircraft system selects a position for condition input lever 15 prior to effecting thrustpower level changes by means of a singular manual control movement applied to lever 16. During a typical aircraft system mission, manipulation of flight condition input lever 15 is infrequent in comparison to manipulation of lever 16 inasmuch as lever 16 alone is utilized to effect changes in degree of propulsion system thrust or power output.

As shown by FIG. 1 (and also by FIGS. 6 and 7), the preferred embodiment of this invention includes a power lever 16 that may be moved to various positions within the range extremes indicated as A and D to vary the level of propulsion system thrustpower output. In such arrangement, two control modes for system power stabilization are provided. The mode of control from position A to position B is a conventional engine power governing control mode; such is used primarily for aircraft system operation at comparatively high airspeeds to readily permit increased mechanization simplicity and consequently improved operational reliability characteristics for the control system. The mode of power stabilization control from position B to position D is a conventional propeller power governing (beta) control mode; this particular manner of control for power stabilization purposes is advantageous for obtaining rapid thrust response to input control movements during aircraft system ground operation. Beta mode power stabilization control also readily permits incorporating a reverse-thrust modulation capability into the propulsion system; such being useful for reducing aircraft landing runway length requirements. Power level lever position A is normally associated with full-forward flight correlated to maximum propulsion system thrustpower output at a maximum rated rotational speed for sustained operation. Position B is associated with normal flight idle. The other extreme power lever position, position D, is associated with full-reverse thrust in the beta mode of control region. An intermediate position C is separately identified for convenience of use in connection with system ground starting operations.

A better understanding of the objectives of the instant invention may be achieved from a consideration of the FIG. 2 and FIG. 3 performance characteristics typically associated with representative turbine engine and variable-pitch propeller subsystems in an aircraft propulsion system. In FIG. 2, curves 22 through 25 illustrate the typical variation of turbine engine fuel consumption as a function of engine shaftpower output for different engine rotational speeds. Curves 22 through 25 specifically relate to engine operation at 100%, 90%, 80%, and 70% levels of turbine engine rated maximum rotational speed. The limit of available shaftpower output is indicated by curve 26; the illustrated performance characteristics are developed for constant operating altitude, ambient temperature, and aircraft airspeed conditions. From the relationships shown in FIG. 2 it should be noted that a minimum fuel consumption rate (maximum fuel economy) is achieved by operating the turbine engine at a minimum engine rotational speed consistent with the required level of engine shaftpower output. Although the data of FIG. 2 pertains specifically to a representative fixed-shaft type of aircraft turbine engine, an identical conclusion may be reached with respect to obtaining maximum fuel economy in connection with free-turbine type aircraft turbine engines.

In FIG. 3, curves 27 through 29 show the typical variation of propeller effectiveness as a function of propeller rotational speed for different levels of shaftpower input. Curves 27 through 29, respectively, relate to 100%, 50%, and 33⅓% levels of maximum rated shaftpower input to the propeller subsystem. The data assumes a proper selection of geometry and size for power matching to the propulsion system engine; the illustrated performance characteristics are developed for constant operating altitude, ambient temperature, aircraft airspeed, and blade geometry conditions. From the relationships shown in FIG. 3 it should be noted that a maximum propeller shaftpower input to thrustpower conversion efficiency may be achieved at a required power output level by properly selecting a propeller optimum operating rotational speed.

The performance characteristics data of FIGS. 2 and 3 may be combined for a composite aircraft propulsion system as shown by FIG. 4. Curves 30 through 33 illustrate the typical variation of propulsion system fuel consumption as a function of propulsion system thrust output for different propulsion system rotational speeds. As in the case of FIG. 2, operating rotational speeds at the 100%, 90%, 80%, and 70% levels of propulsion system rated maximum rotational speed are selected for curves 30 through 33, respectively. The rated output limit of the propulsion system is shown by means of line 34; the illustrated performance characteristics are developed for constant operating altitude, ambient temperature, aircraft airspeed, and propeller geometry conditions. From FIG. 4 it may be concluded that maximum (optimum) propulsion system fuel economy may be achieved by operating the propulsion system at a minimum system rotational speed consistent with the required level of thrust output. It may similarly be concluded that optimum fuel economy for the system may be achieved for normal flight operating conditions by providing the propulsion system with a coordinate schedule of fuel flow and rotational speed. Such a coordinated schedule is illustrated by curve 35 of FIG. 5, and is accomplished through operation of the power management coordination means 21 of the FIG. 1 arrangement.

The perspective view of FIG. 6 is a typical power quadrant arrangement having the input levers 15 and 16 utilized in the practice of this invention. Such levers rotate about shaft 40 and are connected to rods 41 and 42 which serve to transmit the manual control inputs applied to levers 15 and 16 to the power management coordination means 21 detailed schematically in FIG. 10. The power quadrant arrangement also utilizes the indicia shown in FIG. 7 for reference purposes. For convenience of illustration, the various reference positions in the movement ranges for levers 15 and 16 are associated with the positions designated in FIG. 1 by appropriate letter and Roman numeral designations. It should be noted that the power quadrant arrangement of FIG. 6 preferably employs detents comprised of notches 43 cooperating individually with spring-loaded studs such as 44 for conveniently locating the levers at particular positions. In terms of the FIG. 6 and FIG. 7 arrangement, detents are provided for position B (Flight Idle) of thrustpower level input lever 16 and also for positions II and IV (Normal Flight and Fuel Off) of operating condition input lever 15. End stops such as 45 are preferred for each extreme position in each of the two illustrated lever ranges. A gate-lift stop 46 is provided for thrustpower control lever 16 as a precaution to prevent the unintentional scheduling of excessively small or reverse-pitch propeller blade positions in the propeller power governing range of control during normal flight or takeoff/landing operations.

The desired coordination of propulsion system rotational speed and propulsion system fuel flow is developed from manual movement inputs applied to thrustpower lever 16 in the range of positions from A to B and in accordance with the representative schedules of FIGS. 8 and 9. Curve 47 of FIG. 8 illustrates the relation of fuel flow (in terms of percent of maximum rated or allowable fuel flow metered by the engine accessory fuel flow control 12 for the turbine engine actual operating environment) as a function of power lever position. The concurrent coordination of propulsion system rotational speed to obtain optimum fuel economy as a function of power lever position is disclosed by curve 48 of FIG. 9 in the range of from position A to position B. In each case, the various power lever positions in the range of from position A to position B are related to an engine power governing mode of propulsion system control. The range of positions extending from position B through position D, other than for a transition zone effect, in each case is associated with a mode of propulsion system control wherein the pilot-selected level of propeller power operation is controlling, such mode being optional and an alterate relative to the mode of the range from position A to position B. An additional scredule 51 is developed with respect to beta mode control movements applied to power lever 16 as shown by FIG. 11; the range of positions from B to D in FIG. 11 relates to establishing different minimum propeller blade angle settings. FIG. 12 illustrates a schedule 52 for setting system minimum rotational speeds by developing a speed-maintaining supplemental fuel flow as a function of a sensed engine under-speed condition. Various of the curves 49, 50, and 53 in FIGS. 8, 9, and 12 relate to overriding system performance characteristics developed from the manual movements for particular types of aircraft system operation other than normal flight as hereinafter described.

Additional information regarding the instant invention may also be developed from the schematic illustration of FIG. 10. Turbine engine 10 of FIG. 10 is of a fixed-shaft type having a conventional compressor section 60 and a conventional turbine section 61. A burner section 62 is located intermediate sections 60 and 61. Exhaust gases from turbine section 61 are ducted through outlet section 63 and generally overboard the aircraft through an opening such as 64. A conventional reduction gear box 65 connects the output shaft of engine assembly 10 to the variable-pitch propeller assembly referenced generally as 11. The propeller blades 66 of assembly 11 are rotated to different pitch positions by movement of the piston and rod combination 67 in pitch actuator 68. Movement of piston 67 against compression spring 69 by means of pressurized hydraulic fluid ported into actuator 68 results in a decrease of propeller pitch; return movement of piston 67 by spring 69 results in a propeller pitch increase with an ultimate position corresponding to a full-feathered propeller condition. As shown in the drawings, the turbine engine and variable pitch propeller combination is substantially located within a nacelle fairing such as 70.

The power management coordination means 21 of this invention may be provided in either a mechanical, hydraulic, electrical, or equivalent functional embodiment. For convenience of disclosure, however, only a schematic mechanical embodiment of such means is shown in the drawings. In the mechanical embodiment of FIG. 10, input movements applied to levers 15 and 16 of the power quadrant are transmitted by rod members 41 and 42 to the arms 80 and 81 attached to shafts 82 and 83. Shaft 83 is in part positioned interiorly of shaft 82. Rotation of each of shafts 82 and 83 is preferably in a 1:1 ratio to rotation of input levers 15 and 16 about axis 40. In addition to shaft elements 82 and 83, power management coordination means 21 is additionally comprised of the various cam members designated 84 through 91. Cams 84 through 87 are rotationally coupled to shaft 82, cams 88 through 91 are rotationally coupled to shaft 83.

In power management coordinatiton means 21, fuel flow and system rotational speed scheduling is accomplished essentially by means of cam members 84 and 87 connected to shaft 82. As shown in FIG. 10, cam member 85 controls operation of power management primary fuel flow control 17 through the linkage designated 94; cam member 87 controls propeller constant-speed governor unit 18 through connecting linkage 96. Cam surface 100 of cam member 85 accomplishes a schedule corresponding to curve 47 of FIG. 8 by controlling the advancement of metering pin 101 into orifice 102. The pin 101-orifice 102 combination does not restrict the 100% fuel flow normally established for existing engine operating conditions by control 12 when cam member 85 is at its A (100%) operating position. However, continued rotation of cam 85 in a clockwise direction so that surface positions such as B, etc. cause linkage 94 to advance metering pin 101 further into orifice 102 results in the flow of fuel through control 17 being restricted relative to the maximum allowable fuel flow rate according to the included curve 47 schedule. Engine fuel flow control 12 is essentially an engine accessory and is normally provided by the engine manufacturer to assist in developing the engine maximum rated shaft power output for the sensed engine operating conditions; flow control 12 as utilized in this invention does not function to finally obtain different desired levels of aircraft system thrustpower output.

Cam member 87 is rotated simultaneously with cam member 85 so that its surface 103 will cause manual control input movements applied to thrustpower level lever 16 to be directed to propeller constant-speed governor control 18 through linkage 96. Surface 103 of cam member 87 is provided with a schedule corresponding to curve 48 of FIG. 9. As shown in the FIG. 10 arrangement, governor set control 18 functions to direct pressurized hydraulic fluid to and from propeller pitch actuator 68 through controlled displacement of valve element 104. Pressurized hydraulic fluid delivered by engine-driven pump 105 through line 106 is blocked from actuator 68 by the center spool of element 104 when the propulsion system (propeller) rotational speed sensed by flyweight assembly 107 is at its pre-set constant speed level. Movement of valve element 104 in a leftward direction as by an under-speed condition sensed by flyweight assembly 107 permits pressurized fluid to be ported from passageway 106 through control 18, passageway 108, open valve 109, passageway 110, and control 19 into actuator 68 to cause a reduction in propeller pitch. Rightward movement of spool 104 from the illustrated FIG. 10 set speed position permits pressurized fluid in actuator 68 to be ported to the engine lubricating oil reservoir 111 through passageway network 112. Such action permits compression spring means 69 to move piston and rod combination 67 rightward thus increasing propeller pitch angle. Such rightward movement of valve spool 104 in response to a system speed increase change detected by assembly 107 that is an over-speed condition, the increase in pitch caused by spring means 69 in propeller assembly 11 serves to reduce system speed to the speed condition set by cam member 87. Various speed set levels are obtained by changing the balanced position of assembly 107; such is accomplished as a result of varying the degree of compression in spring 113 by re-positioning linkage 96. Also, in the event curve 47 of FIG. 8 is positioned at or slightly above the acceleration fuel flow limit for the engine of the system, it will be required that a delay means (not shown) be included in linkage 96.

In the engine power governing mode of propulsion system stabilization control a pre-set level of engine performance is established primarily by cam members 85 and 87. Although additional cam members 84 and 86 are attached to shaft 82 for simultaneous rotation in response to manual movements applied to thrustpower lever 16, such additional cam members do not function to positively influence propulsion system operating characteristics in the range of positions from A to B. More specifically, rotation of cam member 84 in the range of from A to B does not cause a supplemental flow of fuel to be added to the flow controlled by means 17. Similarly, rotation of cam member 86 in the range of positions from A to B does not change the minimum propeller blade pitch angle set by propeller blade angle control 19 to the A position. In the engine power governing mode, therefore, the system will automatically change the propeller pitch angle to a condition wherein the power absorbed by the propeller will equal the power available at the engine as established by system fuel flow and rotational speed input levels.

In the propeller power governing (beta) mode of propulsion system stabilization control, a pre-set level of propeller assembly thrustpower performance is established primarily by cam members 84 and 86 in the range of positions extending from B through D. Although cam members 85 and 87 are also rotated throughout the additional range of positions, in the beta mode of propulsion system stabilization control such cams do not operate to positively influence system operating characteristics. More specifically, apart from a transition range portion, rotation of cam 85 throughout the position range from B to D does not substantially vary the rate of fuel flow controlled by the metering effect of control unit 17. Also, rotation of cam member 87 in the range of from position B to position D, although acting to re-set propeller constant speed governor control 18 to different values, does not function to establish or positively regulate the rotational speed of the propulsion system. In the beta mode of control, therefore, the system will automatically change the rate of fuel flow to engine 10 by regulating a supplemental fuel flow to a condition wherein the power produced by engine 10 will equal the power requirement established by system propeller pitch angle and rotational speed input levels.

Rotation of cam member 84 in a clockwise direction in the range of from the illustrated B position to the illustrated D position actuates power management secondary fuel flow control 20 to obtain the various supplemental fuel flows illustrated by the differences between curve 47 and curves 49 of FIG. 8. Surface 120 of cam member 84 normally controls the actuation of linkage 93 to pre-set the position of orifice 121. Cooperating metering pin 122 is positionally controlled by flyweight assembly 123 to establish a scheduled supplementary flow of fuel from the fuel line network 124 into chamber 125 in response to sensed engine rotational under-speed conditions. At chamber 125, the supplementary fuel flow established by the orifice 121 and metering pin 122 combination is added to the fuel flow controlled by unit 17 to provide the different total fuel flows illustrated in FIG. 8 in the region from the B to D power level positions. The combined fuel flow is conducted through fuel line 126, open shutoff valve 127, and fuel line 128 to the nozzles of engine burner section 62. As indicated previously, the primary fuel flow established by management control 17 is the maximum or allowable fuel flow established by engine control 12 and conducted through fuel line 129 as modified as a function of the manual input applied to thrustpower level lever 16 in accordance with the configuration of cam surface 100 and the schedule of curve 47. The supplementary fuel flow added to the primary fuel flow in chamber 125 is metered in accordance with engine power output requirements determined as a function of the pilot-set propeller blade angle and system rotational speed established by the contours of slot 114 and surface 120 corresponding to the schedules of curves 51 and 52, respectively. It should be noted that the minimum rotational speed established by the schedule of curve 52 corresponds to the minimum aircraft propulsion rotational speed consistent with a minimum power output level. In the case of a representative aircraft system, a minimum rotational speed such as the 75% level shown in FIG. 12 may be dictated by electrical system or like operating requirements.

As shown in the FIG. 10 schematic arrangement specified propulsion system operating characteristics may be developed by means of cam surfaces 130 through 133 of cam members 88 through 91 carried by shaft 83. Cam surfaces 130 and 131 are provided for use in connection with various aircraft flight and ground maneuvering operations; cam surfaces 132 and 133 are intended for use in connection with propulsion system shut-down and emergency operations. Basically, cam surface 130 may be rotated in a clockwise direction from its illustrated FIG. 10 condition to provide the engine under-speed governor set conditions represented by curves 53 of FIG. 12. Clockwise rotation of cam surface 131, on the other hand, functions to establish the propeller constant-speed governor settings represented by curves 50 in FIG. 9. Cam surfaces 132 and 133 function at condition lever 15 positions corresponding to the positions designated IV and V in FIG. 7. As shown in the schematic illustration, cam surface 132 in position IV repositions linkage 92 so that valve spool 134 blocks the flow of fuel from line 126 to line 128 and the engine burner section. Continued rotation of condition lever 15 to the illustrated position V causes cam surface 133 to reposition linkage 97 and move valve spools 135 and 136. Movement of such valve spools by cam member 91 blocks the flow of pressurized fluid from line 108 through valve 109 and into fluid line 110 and simultaneously causes line 110 to cooperate with network 112 and low-pressure hydraulic fluid reservoir 111.

It is to be understood that the forms of the invention herewith shown and described are to be taken as preferred embodiments of the same, but that various changes in the proportioning, size, and detail of parts may be resorted to without departing from the spirit of the invention or the scope of the subjoined claims.

I claim:

1. An aircraft propulsion system having engine power governing mode of power stabilization with different operating characteristics during normal flight and during critical maneuvering flight, and comprising:

(a) Turbine engine means having an output shaft and a fuel flow control establishing a maximum allowed engine fuel flow rate, (b) Variable-pitch propeller means rotationally driven by said turbine engine means output shaft and having a rotational speed control establishing and maintaining a propulsion system rotational speed, (c) Power management fuel flow metering means cooperatively connected to said turbine engine means fuel flow control in fuel-receiving relation and responsive to inputs that variably restrict said turbine engine means fuel flow control maximum allowed engine fuel flow rate, (d) Power management rotational speed set means cooperatively connected to said variable-pitch propeller means rotational speed control and responsive to inputs that variably establish a value for said propulsion system maintained rotational speed, (e) Output thrustpower level selection means manually movable throughout a range of engine power governing movement positions from a set minimum propulsion system output thrustpower level position to a set maximum propulsion system output thrustpower level position, (f) Operating condition selection means manually movable to different positions including a position associated with normal flight and a position associated with critical maneuvering flight to establish different propulsion system operating characteristics, and (g) Power management coordination means responsive to movement of said output thrustpower level selection means to provide variable inputs to said power management fuel flow metering means and to said power management rotational speed set means as a function of manual movement of said output thrustpower level selection means in said range of movement positions, said power management coordination means providing inputs that variably restrict said turbine engine means fuel flow control maximum allowed engine fuel flow rate and variably establish said propulsion system rotation speed according to a coordinated schedule of optimum fuel economy as a function of movement of said output thrustpower level selection means when said operating condition selection means is in a position associated with normal flight, and said operating condition selection means providing an input to said power management rotational speed set means when in a position associated with critical maneuvering flight that has a value substantially cooresponding to the maximum propulsion system rotational speed value of said power management coordination means input and that overrides the input provided to said power management rotational speed set means by said power management coordination means.

2. The invention defined by claim 1, and further comprising:

(h) Secondary power management fuel flow metering means responsive to a sensed propulsion system rotational speed below a received propulsion system rotational speed under-speed value input to meter a supplementary fuel flow from the aircraft propulsion system fuel supply into said turbine engine means at a rate which is in addition to the restricted engine fuel flow rate metered by the other of said power management fuel flowing metering means, said operating condition selection means when in said critical maneuvering flight position providing an input to said secondary power management fuel flow metering means that has a value substantially corresponding to just below the propulsion system rotational speed value of said operating condition selection means input to said power management rotational speed set means.

References Cited

UNITED STATES PATENTS

| | | | |
|---|---|---|---|
| 2,588,371 | 3/1952 | Englesson | 170—135.74 |
| 2,865,171 | 12/1958 | Gaubatz | 170—135.74 X |
| 2,935,136 | 5/1960 | Wall et al. | 170—135.74 |
| 2,941,601 | 6/1960 | Best | 170—135.74 |

JULIUS E. WEST, *Primary Examiner.*